US012253721B2

(12) United States Patent
Brace et al.

(10) Patent No.: US 12,253,721 B2
(45) Date of Patent: Mar. 18, 2025

(54) LIGHTING AND PROCESSING FOR MICROSCOPIC MEASUREMENT OF A POLISH RADIUS AND AN APEX OFFSET OF A FIBER OPTIC CONNECTOR

(71) Applicant: VIAVI Solutions Inc., San Jose, CA (US)

(72) Inventors: Jay Gregory Brace, Seattle, WA (US); Kevin Cassady, Monroe, WA (US); Robert Matthew Adams, Ottawa (CA)

(73) Assignee: VIAVI Solutions Inc., Chandler, AZ (US)

( * ) Notice: Subject to any disclaimer, the term of this patent is extended or adjusted under 35 U.S.C. 154(b) by 807 days.

(21) Appl. No.: 17/443,188

(22) Filed: Jul. 22, 2021

(65) Prior Publication Data

US 2022/0291455 A1    Sep. 15, 2022

Related U.S. Application Data

(63) Continuation-in-part of application No. 17/249,786, filed on Mar. 12, 2021, now Pat. No. 11,828,926.

(51) Int. Cl.
*G02B 6/38* (2006.01)
*G01M 11/00* (2006.01)

(52) U.S. Cl.
CPC ............ *G02B 6/385* (2013.01); *G01M 11/31* (2013.01); *G02B 6/3825* (2013.01); *G02B 6/3863* (2013.01)

(58) Field of Classification Search
CPC .... G02B 6/385; G02B 6/3825; G02B 6/3863; G01M 11/31
USPC .......................................................... 385/72
See application file for complete search history.

(56) References Cited

U.S. PATENT DOCUMENTS

| 4,601,551 A | 7/1986 | Pettingell et al. |
| 5,724,127 A | 3/1998 | Csipkes et al. |
| 5,768,401 A * | 6/1998 | Csipkes ............... G02B 6/3843 382/284 |

(Continued)

FOREIGN PATENT DOCUMENTS

WO    WO-2020018514 A1 *   1/2020   .......... G01M 11/088

OTHER PUBLICATIONS

Co-pending U.S. Appl. No. 17/249,786, entitled "Shaped Reflector for Coaxial Illumination of Non-Normal Surfaces," by Cassady et al., filed Mar. 12, 2021, 23 Pages.

*Primary Examiner* — Tuyen Tra
*Assistant Examiner* — Rahman Abdur
(74) *Attorney, Agent, or Firm* — Harrity & Harrity, LLP (57) ABSTRACT

A microscope may receive a fiber optic connector via a connector adapter that includes an opening and may align a ferrule of the fiber optic connector with the opening of the connector adapter, where the ferrule includes a ferrule endface. The microscope may transmit light onto the ferrule endface and may receive reflected light, as an image of the ferrule endface, with a camera of the microscope. The microscope may determine intensities of brightness of the image and may create a topographical map of the intensities of the brightness of the image. The microscope may determine a radius and an apex of the ferrule endface based on the topographical map and may calculate an apex offset of the ferrule endface based on the radius and the apex of the ferrule endface. The microscope may perform one or more actions based on the apex offset of the ferrule endface.

20 Claims, 10 Drawing Sheets

(56) References Cited

U.S. PATENT DOCUMENTS

| | | | |
|---|---|---|---|
| 8,104,976 B2* | 1/2012 | Zhou | G02B 6/3833 |
| | | | 359/368 |
| 8,306,760 B1* | 11/2012 | Koudelka | G01B 11/2441 |
| | | | 702/35 |
| 9,841,567 B1* | 12/2017 | Zhou | G02B 26/0816 |
| 2008/0074676 A1* | 3/2008 | Koudelka | G01N 21/8806 |
| | | | 356/600 |
| 2008/0177183 A1 | 7/2008 | Courtney et al. | |
| 2012/0133946 A1* | 5/2012 | Eckman | G02B 23/2423 |
| | | | 356/450 |
| 2013/0321906 A1 | 12/2013 | Kriofske et al. | |
| 2014/0005555 A1 | 1/2014 | Tesar | |
| 2016/0291257 A1 | 10/2016 | Huang et al. | |
| 2018/0024341 A1 | 1/2018 | Romanowski et al. | |
| 2021/0270695 A1* | 9/2021 | Diepstraten | G01M 11/088 |

* cited by examiner

LIGHTING AND PROCESSING FOR MICROSCOPIC MEASUREMENT OF A POLISH RADIUS AND AN APEX OFFSET OF A FIBER OPTIC CONNECTOR

CROSS-REFERENCE TO RELATED APPLICATION

This Patent Application is a continuation-in-part of prior U.S. patent application Ser. No. 17/249,786, filed on Mar. 12, 2021, and entitled "SHAPED REFLECTOR FOR COAXIAL ILLUMINATION OF NON-NORMAL SURFACES." The disclosure of the prior application is considered part of and is incorporated by reference into this Patent Application.

BACKGROUND

A microscope, such as a video microscope, may be used to view a fiber optic connector and to determine imperfections in the fiber optic connector.

SUMMARY

Some implementations described herein relate to a method. The method may include receiving a fiber optic connector via a connector adapter of a microscope, where the connector adapter includes an opening. The method may include aligning a ferrule of the fiber optic connector with the opening of the connector adapter of the microscope, where the ferrule includes a ferrule endface. The method may include transmitting light onto the ferrule endface and receiving reflected light, as an image of the ferrule endface, with a camera of the microscope. The method may include determining intensities of brightness of the image and creating a topographical map of the intensities of the brightness of the image. The method may include determining a radius and an apex of the ferrule endface based on the topographical map and calculating an apex offset of the ferrule endface based on the radius and the apex of the ferrule endface. The method may include performing one or more actions based on the apex offset of the ferrule endface.

Some implementations described herein relate to a microscope. The microscope may include a connector adapter that includes an opening. The connector adapter may be configured to align a ferrule of a fiber optic connector with the opening of the connector adapter, and the ferrule may include a ferrule endface. The microscope may include a light source configured to transmit light to the ferrule endface and a camera configured to receive reflected light as an image of the ferrule endface. The microscope may include one or more processors configured to determine intensities of brightness of the image and create a topographical map of the intensities of the brightness of the image. The one or more processors may be configured to determine a radius and an apex of the ferrule endface based on the topographical map and calculate an apex offset of the ferrule endface based on the radius and the apex of the ferrule endface. The one or more processors may be configured to perform one or more actions based on the apex offset of the ferrule endface.

Some implementations described herein relate to a system. The system may include a fiber optic connector that includes a ferrule with a ferrule endface. The system may include a microscope that includes a connector adapter with an opening. The connector adapter may be configured to align the ferrule of the fiber optic connector with the opening of the connector adapter. The microscope may include a light source configured to transmit light to the ferrule endface and a camera configured to receive reflected light as an image of the ferrule endface. The microscope may include one or more processors configured to determine intensities of brightness of the image and create a topographical map of the intensities of the brightness of the image. The one or more processors may be configured to determine a radius and an apex of the ferrule endface based on the topographical map and calculate an apex offset of the ferrule endface based on the radius and the apex of the ferrule endface. The one or more processors may be configured to perform one or more actions based on the apex offset of the ferrule endface.

DETAILED DESCRIPTION

The following detailed description of example implementations refers to the accompanying drawings. The same reference numbers in different drawings may identify the same or similar elements.

A fiber optic connector may include a connector body that retains a cylindrical ceramic ferrule. The ferrule includes a small bore through a central axis that supports a piece of optical fiber. A flexible jacket may house the optical fiber that exits the fiber optic connector. The optical fiber is fixed in place in the bore, and the optical fiber and an endface of the ferrule are polished to a smooth finish. Typically, a chamfer or a bevel is added at a circular edge formed between the endface and a cylindrical face of the ferrule. The chamfer protects the edge from damage and facilitates insertion into mating adapters.

A microscope may use illumination to illuminate surfaces of the ferrule. Light emitted from a light source of the microscope reflects from a beam splitter (e.g., half of the light reflects, and half of the light passes through). The light reflected from the beam splitter passes through a lens of the microscope and reflects from the ferrule endface and the optical fiber. The reflected light passes back through the lens and forms an image of the ferrule endface at a camera of the microscope.

Current inspection techniques require an interferometric microscope to determine a geometry associated with a ferrule endface. The interferometric microscope is an expensive and sensitive piece of equipment. For example, the interferometric microscope is significantly more expensive than a light microscope. The interferometric microscope is also much more sensitive to handling than the light microscope. Thus, current inspection techniques consume computing resources (e.g., processing resources, memory resources, communication resources, and/or the like), networking resources, human resources, and/or the like associated with purchasing an expensive interferometric microscope, training personnel on how to operate the interferometric microscope, handling the sensitive interferometric microscope, and/or the like.

Some implementations described herein relate to a microscope (e.g., a light microscope) that provides microscopic measurement of a polish radius and an apex offset of a fiber optic connector. For example, the microscope may receive a fiber optic connector via a connector adapter that includes an opening and may align a ferrule of the fiber optic connector with the opening of the connector adapter, where the ferrule includes a ferrule endface. The microscope may transmit light onto the ferrule endface and may receive reflected light, as an image of the ferrule endface, with a camera of the microscope. The microscope may determine intensities of brightness of the image and may create a topographical map of the intensities of the brightness of the image. The microscope may determine a radius and an apex of the ferrule endface based on the topographical map and may calculate an apex offset of the ferrule endface based on the radius and the apex of the ferrule endface. The microscope may perform one or more actions based on the apex offset of the ferrule endface.

In this way, the microscope provides microscopic measurement of a polish radius and an apex offset of a fiber optic connector. The microscope may provide a large field of view and coaxial lighting that enables viewing the entire ferrule endface (or a significant portion thereof) of a polished fiber optic connector. The polishing process may produce a ferrule endface that includes a spherical profile. An apex of the spherical profile may ideally be concentric with a mechanical center of the ferrule endface. A light source of the microscope may provide Köhler illumination to produce a highly consistent intensity when imaging a flat surface of the ferrule endface. When used to image a spherical (or other non-planar) surface, the intensity of illumination reflected and observed at an image plane may be directly related to a degree to which a point in an object field deviates from normal to an optical axis of the ferrule endface. This, in turn, conserves computing resources, networking resources, human resources, and/or the like that would otherwise have been consumed in purchasing an expensive interferometric microscope, training personnel on how to operate the interferometric microscope, handling the sensitive interferometric microscope, and/or the like.

FIGS. 1A-1H are diagrams of an example 100 associated with lighting and processing for microscopic measurement of a polish radius and an apex offset of a fiber optic connector. As shown in FIGS. 1A-1H, example 100 includes a microscope 105 and a fiber optic connector 110. The microscope 105 may include an optical microscope with or without a display, a video microscope used to view the fiber optic connector 110 and to determine imperfections in the fiber optic connector 110, and/or the like. The fiber optic connector 110 may include any fiber optic connector that includes an optical fiber, such as a fiber-optic connector (FC), an FC/physical content (PC) connector, an FC/angled physical content (APC) connector, a snap-in connector (SC), a straight tip (ST) connector, a small-form factor (LC) connector, and/or the like. Further details of the microscope 105 and the fiber optic connector 110 are provided elsewhere herein.

Figure 1A:
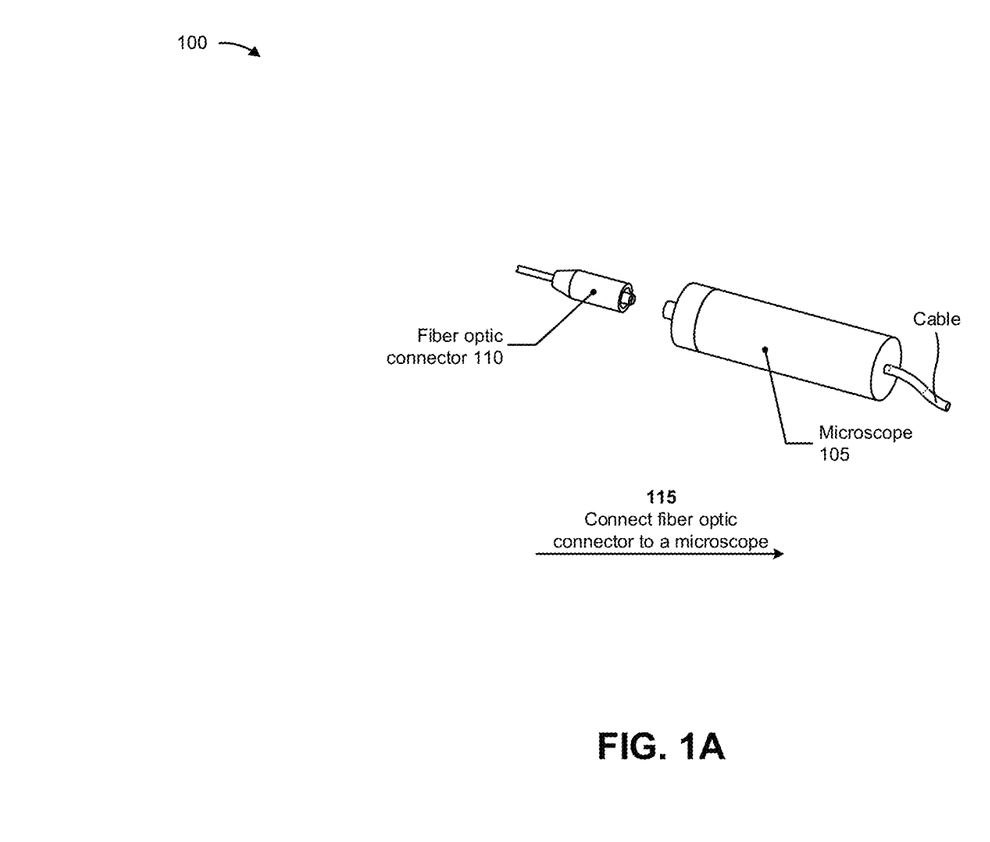
FIGS. 1A-1H are diagrams of an example implementation described herein.

As shown in FIG. 1A, and by reference number 115, the fiber optic connector 110 may be connected to the microscope 105. For example, the fiber optic connector 110 may be inserted into the microscope 105 so that the fiber optic connector 110 may be retained in and tested by the microscope 105. Further details of the interconnection of the fiber optic connector 110 and the microscope 105 are provided elsewhere herein. As further shown in FIG. 1A, a cable may connect to the microscope 105 and may enable communication between the microscope 105 and other devices (e.g., a standalone computing device, a cloud-based device, a server device, and/or the like).

Figure 1B:
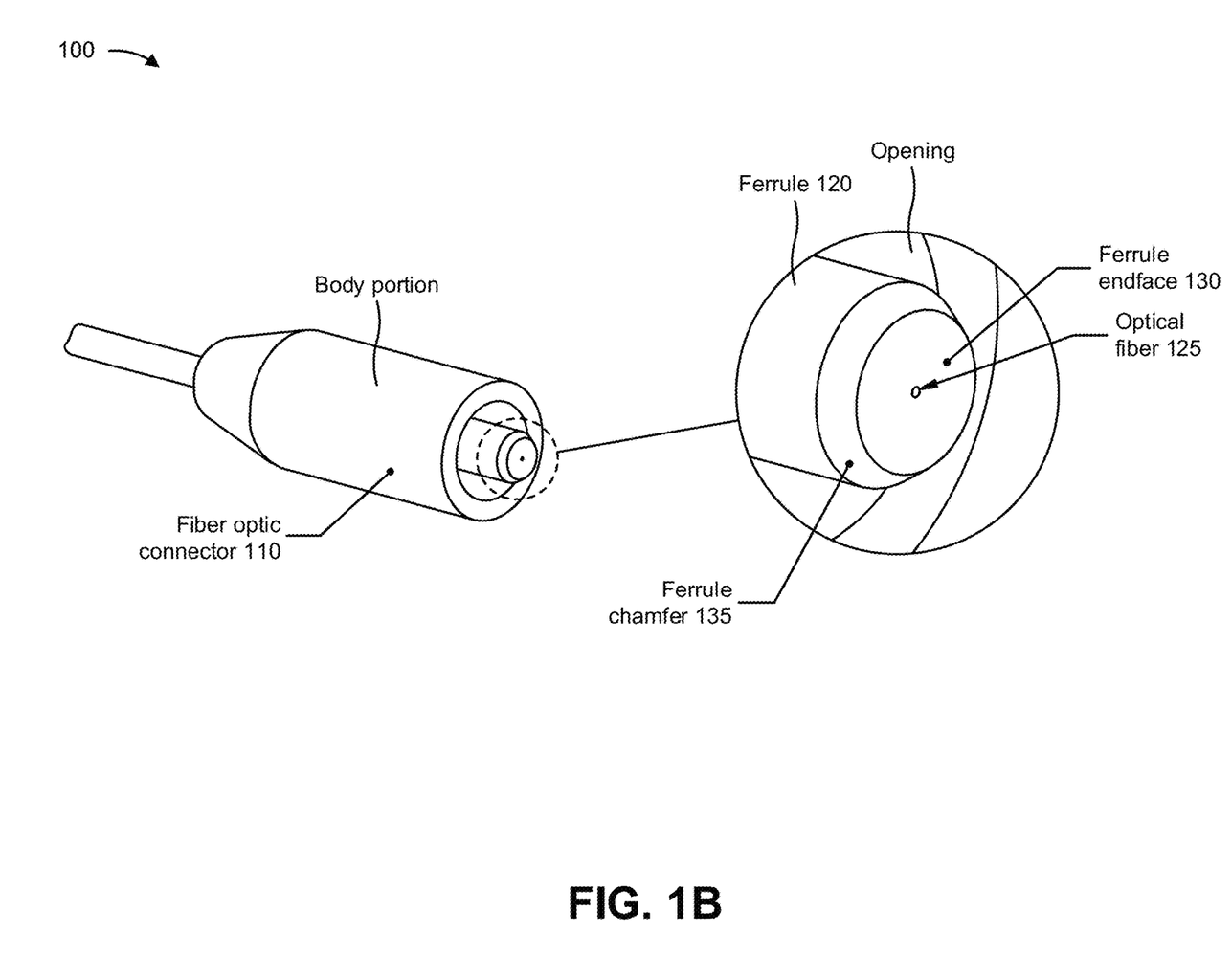

As shown in FIG. 1B, the fiber optic connector 110 may include a ferrule 120 that extends through a body portion of the fiber optic connector 110 and outward away from an opening of the body portion. The ferrule 120 may be cylindrical, square, rectangular, and/or the like in shape and may be made from a variety of materials, such as plastic, stainless steel, ceramic, and/or the like. The ferrule 120 may be sized and shaped based on an application of the fiber optic connector 110 (e.g., based on a size and shape associated with a mating fiber optic adapter). The ferrule 120 may include a bore through a central axis that includes an optical fiber 125. The optical fiber 125 may be fixed in place in the bore. The ferrule 120 may include a ferrule endface 130. Optical fiber 125 and ferrule endface 130 may be polished to a smooth finish. Ferrule 120 may include a ferrule chamfer 135 or a bevel provided at an edge formed between ferrule endface 130 and an outer surface of the body portion of the ferrule 120. The ferrule chamfer 135 may protect the edge from damage and may facilitate insertion into mating fiber optic adapters. The ferrule endface 130 may be polished to produce an endface with a spherical or other non-planar surface.

Figure 1C:
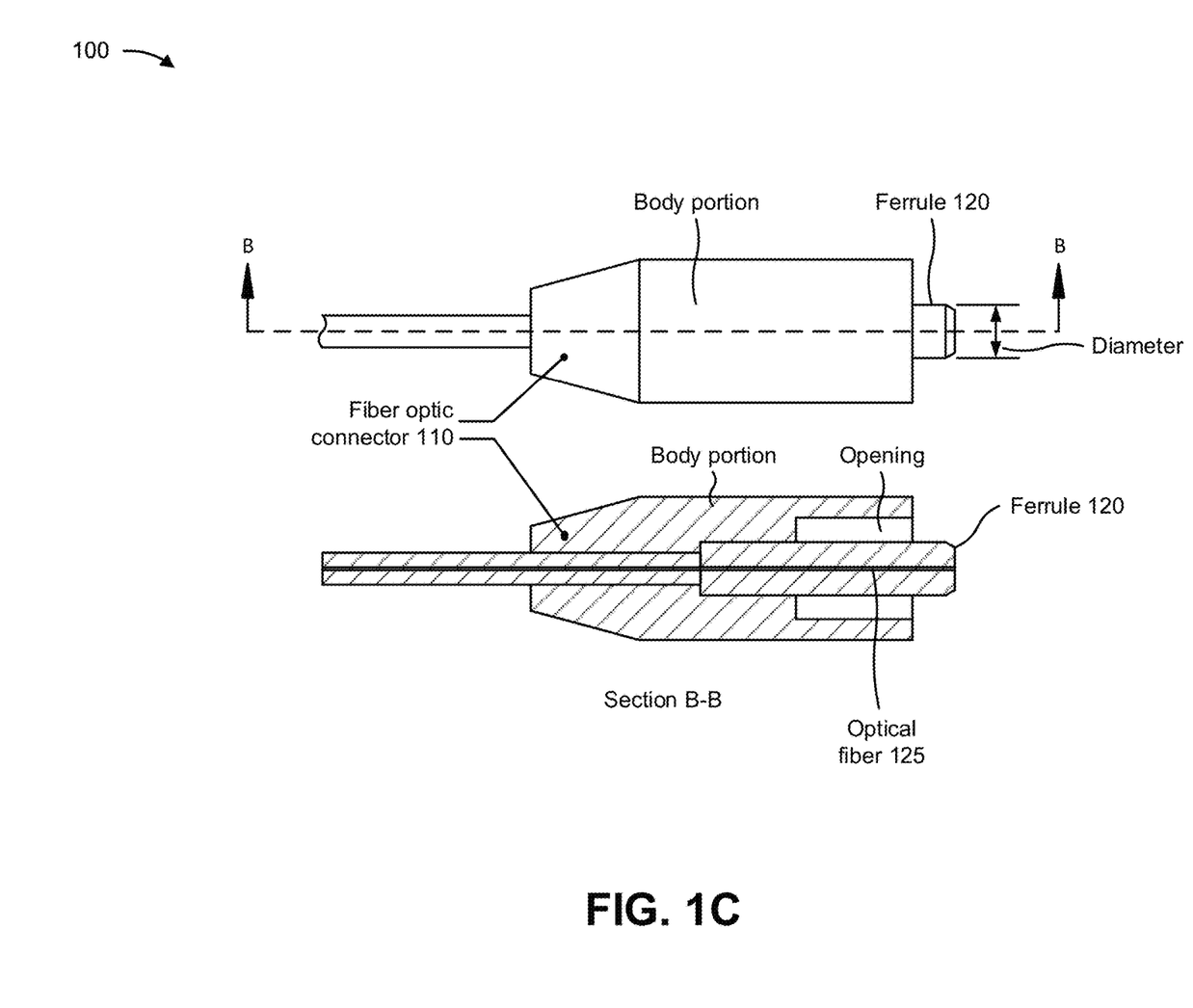

A side view of the fiber optic connector 110 is shown in the top part of FIG. 1C and a sectional view of the fiber optic connector 110, taken along line B-B of the side view, is shown in the bottom part of FIG. 1C. As shown in the side view, the ferrule 120 may include a diameter that is based on an application of the fiber optic connector 110. For example, the diameter may range from approximately one millimeter (1 mm) to approximately three millimeters (3 mm). As shown in the sectional view, the ferrule 120 may extend from within the body portion of the fiber optic connector 110, through the opening of the fiber optic connector 110, and away from the body portion and the opening.

Figure 1D:
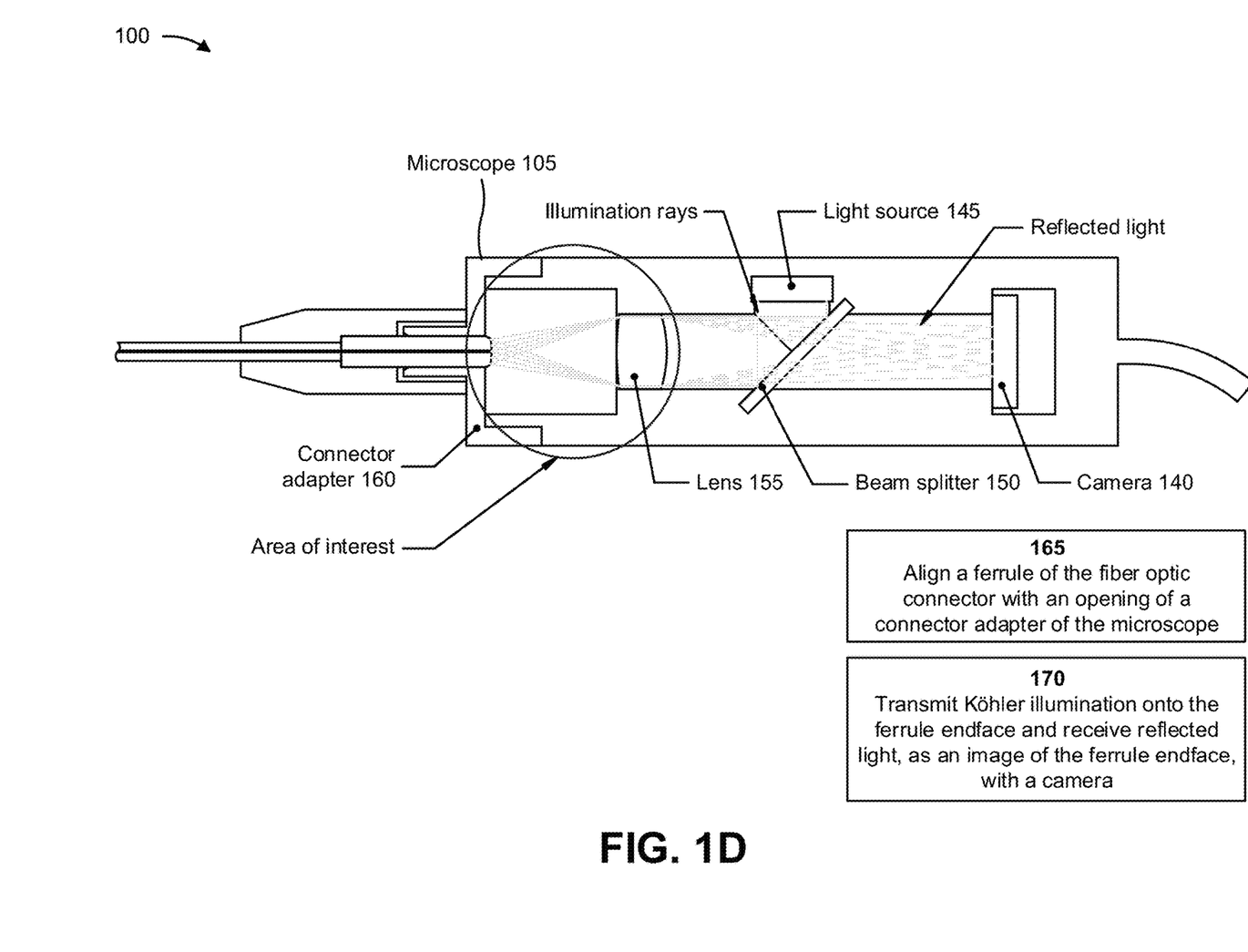

As shown in FIG. 1D, the microscope 105 may include a camera 140, a light source 145, a beam splitter 150, a lens 155, and a connector adapter 160. The camera 140 may include an image sensor that captures images provided by light reflected from the ferrule endface 130. For example, the camera 140 may include a complementary metal-oxide-semiconductor (CMOS) megapixel image sensor. The light source 145 may include a light-emitting diode (LED) light source, an incandescent light source, a fluorescent light source, a halogen light source, and/or the like that generates light. In some implementations, the light source 145 transmits light (e.g., illumination rays), such as Köhler illumination. Köhler illumination is a method of object illumination used for transmitted and reflected light (e.g., trans-illuminated and epi-illuminated) optical microscopy. Köhler illumination acts to generate an even illumination of an object and ensures that an image of the illumination source (e.g., a halogen lamp filament) is not visible in the resulting image. The Köhler illumination may produce a highly consistent intensity when imaging a flat surface, such as a flat surface of the ferrule 120.

The beam splitter 150 may include an optical device that splits a beam of light in two. For example, the beam splitter 150 may include two triangular glass prisms that are joined together to form a cube, such that half of light incident on one face of the cube is reflected and another half of the light is transmitted due to frustrated total internal reflection.

In operation, the microscope 105 may utilize a single light source (e.g., the light source 145) to provide microscopy lighting techniques that illuminate surfaces of the ferrule 120 and the ferrule endface 130. The microscope 105 may utilize lighting and processing techniques to characterize a geometry (e.g., a polish radius and an apex offset) of the ferrule endface 130. The microscope 105 may include a large field of view and coaxial lighting so that the microscope may view the entire ferrule endface 130 (or a significant portion thereof) of the fiber optic connector 110. An apex of the spherical surface of the ferrule endface 130 may ideally be concentric with a mechanical center of the fiber optic connector 110. When the light source 145 is used to image a spherical or other non-planar surface of the ferrule endface 130, an intensity of illumination reflected and observed at the camera 140 may be directly related to a degree to which a point in an object field deviates from normal to an optical axis.

As further shown in FIG. 1D, light (e.g., illumination rays) emitted from the light source 145 of the microscope 105 may reflect from the beam splitter 150 towards the lens 155. The light reflected from the beam splitter 150 may be split by the lens 155 of the microscope 105 and may reflect from the ferrule endface 130 and the optical fiber 125 as reflected light (e.g., dashed lines). The reflected light passes back through the lens 155 and forms an image of the optical fiber 125 and the ferrule endface 130 at the camera 140. The lens 155 may include a transmissive optical device that focuses or disperses a light beam by means of refraction.

The connector adapter 160 may be sized and shaped to fit within and connect to an end portion of the microscope 105 (e.g., an end portion that is opposite of an end portion associated with the camera 140). The connector adapter 160 may be formed from a variety of materials (e.g., metal, plastic, glass, and/or the like), and may include an opening that is sized and shaped to receive and retain the ferrule 120 of the fiber optic connector 110. In some implementations, the opening of the connector adapter 160 is axially aligned with an axis of the ferrule 120 (e.g., the bore provided through the ferrule 120 and including the optical fiber 125).

As further shown in FIG. 1D, and by reference number 165, the ferrule 120 of the fiber optic connector 110 may be aligned with and retained in the opening of the connector adapter 160 of the microscope 105. As shown by reference number 170, the light (e.g., the Köhler illumination) from the light source 145 may be transmitted onto the optical fiber 125 and the ferrule endface 130 and may be received as reflected light (e.g., an image of the ferrule endface 130) with the camera 140. For example, and as shown in the magnified view of FIG. 1D (e.g., area of interest), some of the light may be transmitted to the optical fiber 125 and reflected by the optical fiber 125 as reflected light (e.g., an image of the optical fiber 125). The reflected light from the optical fiber 125 may travel through the lens 155 and the beam splitter 150 and may be received by the camera 140. Some of the light may be transmitted to the ferrule endface 130 and reflected by the ferrule endface 130 as reflected light (e.g., an image of the ferrule endface 130). The reflected light from the ferrule endface 130 may travel through the lens 155 and the beam splitter 150 and may be received by the camera 140.

Figure 1E:
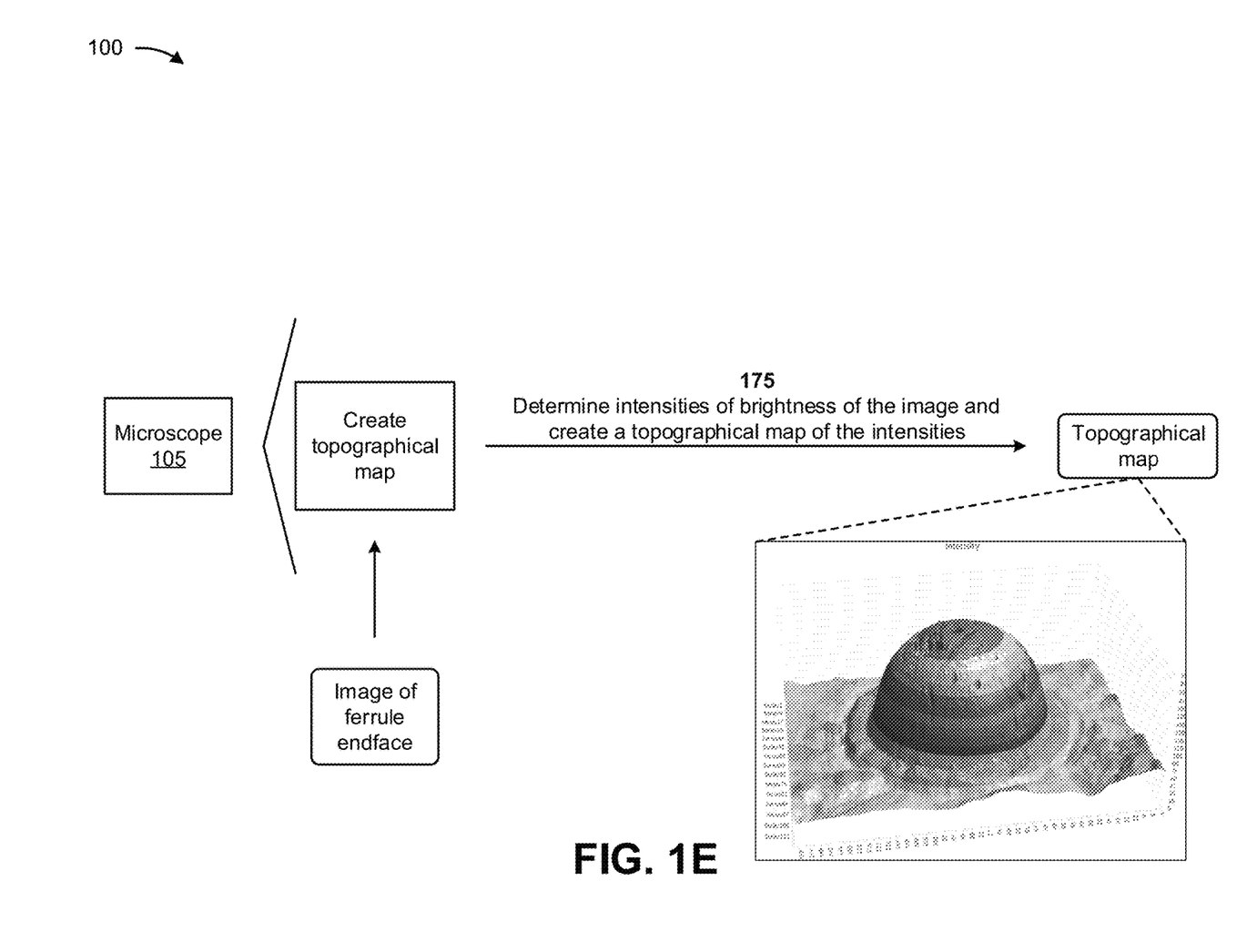

As shown in FIG. 1E, and by reference number 175, the microscope 105 may determine intensities of brightness of the image and may create a topographical map of the intensities. For example, the microscope 105 may analyze the image of the ferrule endface 130 received by the camera 140 to determine the intensities of brightness associated with the reflected light that created the image. An intensity may include a value of a pixel in the image. For example, in an eight-bit grayscale image there are two-hundred and fifty-six (256) gray levels and any pixel in an image may have an intensity value from zero to two-hundred and fifty-five (255). In some implementations, the microscope 105 may determine the intensities of the brightness of the image outward from a mechanical axis of the ferrule 120.

The topographical map may include a spherical or other non-planar surface that depicts different intensities associated with the light reflected from the ferrule endface 130. For example, when the ferrule endface 130 is spherical in shape, the light reflected from different portions of the spherical surface of the ferrule endface 130 may include different intensities of brightness. Thus, the topographical map may provide a representation of the shape of the surface of the ferrule endface 130.

Figure 1F:
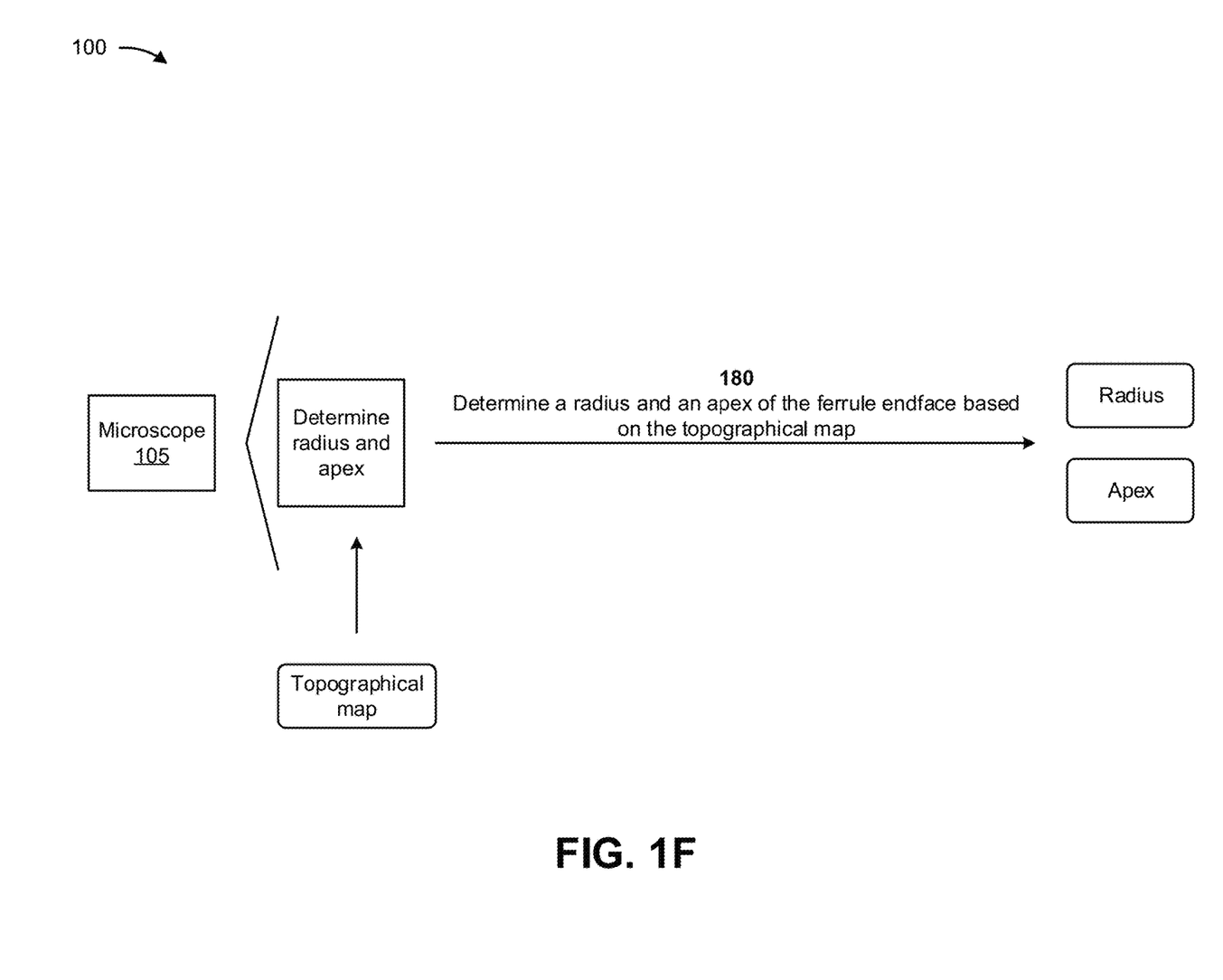

As shown in FIG. 1F, and by reference number 180, the microscope 105 may determine a radius (e.g., a polish radius or a radius of curvature) and an apex of the ferrule endface 130 based on the topographical map. For example, the microscope 105 may determine the apex of the ferrule endface 130 as a brightest spot (e.g., a point with a greatest intensity) in the topographical map. The microscope 105 may determine the radius of the ferrule endface 130 based on a rate at which the intensities, depicted in the topographical map, diminish moving away from the apex (e.g., the brightest spot in the topographical map).

Figure 1G:
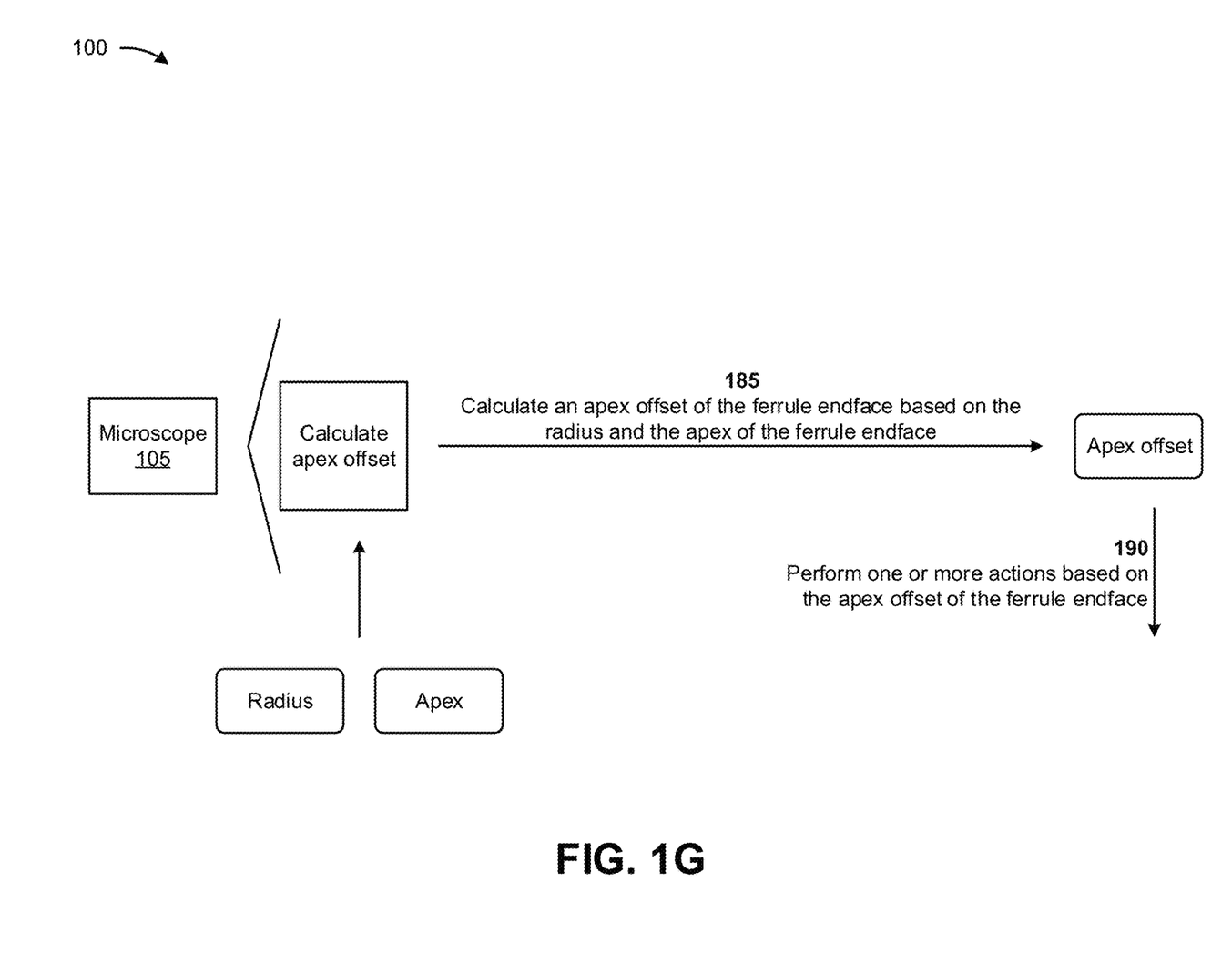

As shown in FIG. 1G, and by reference number 185, the microscope 105 may calculate an apex offset of the ferrule endface 130 based on the radius and the apex of the ferrule endface 130. For example, when calculating the apex offset of the ferrule endface 130 based on the radius and the apex of the ferrule endface 130, the microscope 105 may determine a center (e.g., a mechanical center) of the ferrule endface 130 based on an outer diameter of the ferrule 120. The microscope may then calculate, as the apex offset, a difference between the center of the ferrule endface 130 and the apex of the ferrule endface 130. The apex of the ferrule endface 130 may ideally be concentric with a mechanical center of the fiber optic connector 110.

As further shown in FIG. 1G, and by reference number 190, the microscope 105 may perform one or more actions based on the apex offset of the ferrule endface 130. In some implementations, the one or more actions include the microscope 105 providing, for display, data identifying the apex offset of the ferrule endface 130. For example, the microscope 105 may display the data identifying the apex offset of the ferrule endface 130 to a user of the microscope 105. The user of the microscope 105 may determine whether the ferrule endface 130 is functional based on the apex offset. If the ferrule endface 130 is functional, the fiber optic connector 110 may be utilized. If the ferrule endface 130 is not functional, the fiber optic connector 110 may be reprocessed to further polish the ferrule endface 130. In this way, the microscope 105 conserves computing resources, networking resources, human resources, and/or the like that would otherwise have been consumed in performing incorrect inspections of fiber optic connectors, incorrectly determining that faulty fiber optic connectors are functional, implementing faulty fiber optic connectors in networks, losing network data because of the faulty fiber optic connectors, and/or the like.

In some implementations, the one or more actions include the microscope 105 causing a technician to modify the ferrule endface 130 based on the apex offset. For example, if the apex offset indicates that the ferrule endface 130 is not functional, the microscope 105 may instruct the technician to reprocess the fiber optic connector 110 by further polishing the ferrule endface 130 until the ferrule endface 130 is functional. In this way, the microscope 105 conserves computing resources, networking resources, human resources, and/or the like that would otherwise have been consumed in incorrectly determining that faulty fiber optic connectors are functional, implementing faulty fiber optic connectors in networks, losing network data because of the faulty fiber optic connectors, and/or the like.

In some implementations, the one or more actions include the microscope 105 causing a modification to a manufacturing process of the ferrule endface 130 based on the apex offset. For example, if the apex offset indicates that the ferrule endface 130 is not functional, the microscope 105 may instruct a manufacturer of the fiber optic connector 110 to modify a process associated with polishing the ferrule endface 130 so that future generated ferrule endfaces 130 are functional. In this way, the microscope 105 conserves computing resources, networking resources, human resources, and/or the like that would otherwise have been consumed in incorrectly determining that faulty fiber optic connectors are functional, implementing faulty fiber optic connectors in networks, losing network data because of the faulty fiber optic connectors, and/or the like.

In some implementations, the one or more actions include the microscope 105 providing, for display, an indication that the apex offset satisfies an offset value threshold for the ferrule endface 130. For example, the microscope 105 may display the indication that the apex offset satisfies the offset value threshold to a user of the microscope 105. The user of the microscope 105 may determine that the ferrule endface 130 is functional and may be utilized based on the apex offset satisfying the offset value threshold. In this way, the microscope 105 conserves computing resources, networking resources, human resources, and/or the like that would otherwise have been consumed in performing incorrect inspections of fiber optic connectors, incorrectly determining that faulty fiber optic connectors are functional, implementing faulty fiber optic connectors in networks, losing network data because of the faulty fiber optic connectors, and/or the like.

In some implementations, the one or more actions include the microscope 105 determining that the apex offset fails to satisfy an offset value threshold and causing a technician to modify the ferrule endface 130 based on the apex offset failing to satisfy the offset value threshold. For example, the microscope 105 may display the indication that the apex offset fails to satisfy the offset value threshold to a user of the microscope 105. The user of the microscope 105 may determine that the ferrule endface 130 is not functional based on the apex offset failing to satisfy the offset value threshold. The user or the microscope 105 may instruct the technician to reprocess the fiber optic connector 110 by further polishing the ferrule endface 130 until the ferrule endface 130 is functional. In this way, the microscope 105 conserves computing resources, networking resources, human resources, and/or the like that would otherwise have been consumed in incorrectly determining that faulty fiber optic connectors are functional, implementing faulty fiber optic connectors in networks, losing network data because of the faulty fiber optic connectors, and/or the like.

Figure 1H:
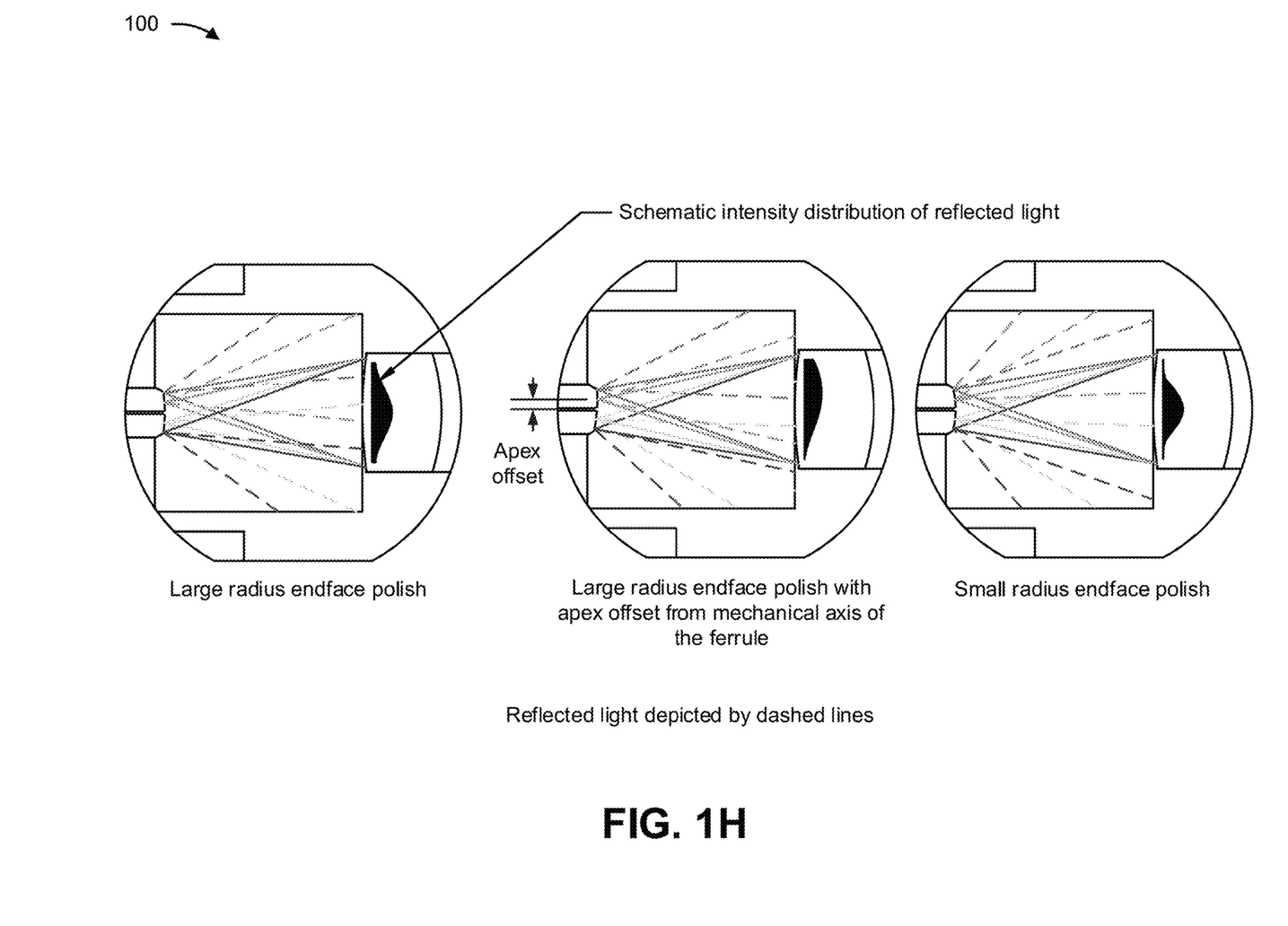

FIG. 1H depicts three different ferrule endfaces 130 of three different fiber optic connectors 110. The left view of FIG. 1H depicts a first ferrule endface 130 with a standard large radius endface polish. A schematic intensity distribution of reflected light (e.g., which is a portion of the topographical map) indicates an even distribution, with a first apex, of light reflected from the first endface 130.

The middle view of FIG. 1H depicts a second ferrule endface 130 with a large radius endface polish but with an apex offset from a mechanical axis of the ferrule 120. A schematic intensity distribution of reflected light (e.g., which is a portion of the topographical map) indicates a skewed distribution, with a second apex (e.g., that is offset), of light reflected from the second endface 130.

The right view of FIG. 1H depicts a third ferrule endface 130 with a small radius endface polish that is smaller than the endface polishes of the first ferrule endface 130 and the second ferrule endface 130. A schematic intensity distribution of reflected light (e.g., which is a portion of the topographical map) indicates an even distribution, with a third apex, of light reflected from the third endface 130. The third apex may be greater than the first apex and the second apex.

In this way, the microscope 105 provides microscopic measurement of a polish radius and an apex offset of the fiber optic connector 110. The microscope 105 may provide a large field of view and coaxial lighting that enables viewing the entire ferrule endface 130 (or a significant portion thereof) of a polished fiber optic connector 110. The polishing process may produce a ferrule endface 130 that includes a spherical profile. An apex of the spherical profile may ideally be concentric with a mechanical center of the ferrule endface 130. The light source 145 of the microscope 105 may provide Köhler illumination to produce a highly consistent intensity when imaging a flat surface of the ferrule endface 130. When used to image a spherical (or other non-planar) surface, the intensity of illumination reflected and observed at an image plane may be directly related to a degree to which a point in an object field deviates from normal to an optical axis of the ferrule endface 130. This, in turn, conserves computing resources, networking resources, human resources, and/or the like that would otherwise have been consumed in purchasing an expensive interferometric microscope, training personnel on how to operate the interferometric microscope, handling the sensitive interferometric microscope, and/or the like.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
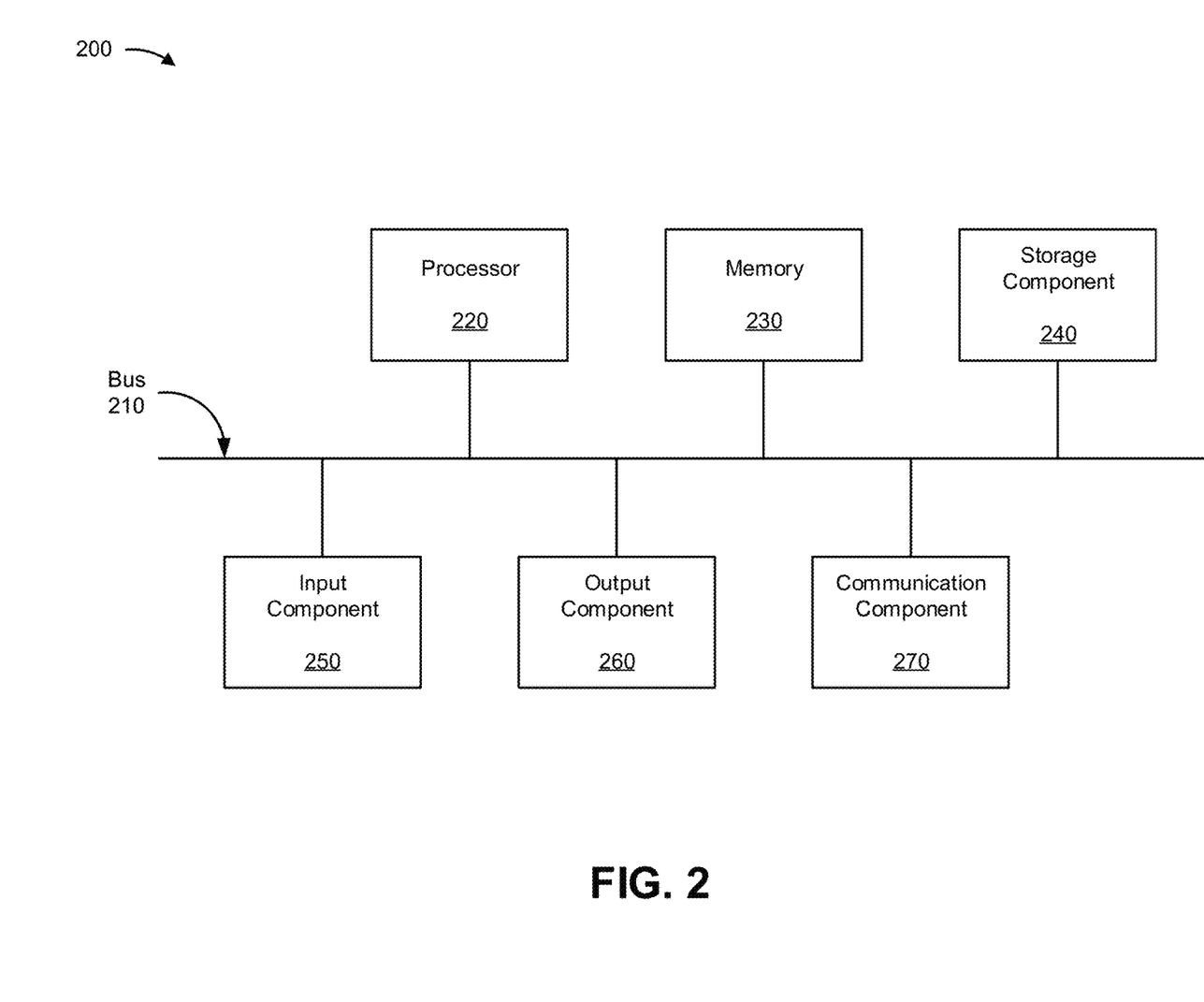
FIG. 2 is a diagram of example components of one or more devices of FIGS. 1A-1H.

FIG. 2 is a diagram of example components of a device 200, which may correspond to the microscope 105. In some implementations, the microscope 105 may include one or more devices 200 and/or one or more components of the device 200. As shown in FIG. 2, the device 200 may include a bus 210, a processor 220, a memory 230, a storage component 240, an input component 250, an output component 260, and a communication component 270.

The bus 210 includes a component that enables wired and/or wireless communication among the components of the device 200. The processor 220 includes a central processing unit, a graphics processing unit, a microprocessor, a controller, a microcontroller, a digital signal processor, a field-programmable gate array, an application-specific integrated circuit, and/or another type of processing component. The processor 220 is implemented in hardware, firmware, or a combination of hardware and software. In some implementations, the processor 220 includes one or more processors capable of being programmed to perform a function. The memory 230 includes a random-access memory, a read only memory, and/or another type of memory (e.g., a flash memory, a magnetic memory, and/or an optical memory).

The storage component 240 stores information and/or software related to the operation of the device 200. For example, the storage component 240 may include a hard disk drive, a magnetic disk drive, an optical disk drive, a solid-state disk drive, a compact disc, a digital versatile disc, and/or another type of non-transitory computer-readable medium. The input component 250 enables the device 200 to receive input, such as user input and/or sensed inputs. For example, the input component 250 may include a touch screen, a keyboard, a keypad, a mouse, a button, a microphone, a switch, a sensor, a global positioning system component, an accelerometer, a gyroscope, and/or an actuator. The output component 260 enables the device 200 to provide output, such as via a display, a speaker, and/or one or more light-emitting diodes. The communication component 270 enables the device 200 to communicate with other devices, such as via a wired connection and/or a wireless connection. For example, the communication component 270 may include a receiver, a transmitter, a transceiver, a modem, a network interface card, and/or an antenna.

The device 200 may perform one or more processes described herein. For example, a non-transitory computer-readable medium (e.g., the memory 230 and/or the storage component 240) may store a set of instructions (e.g., one or more instructions, code, software code, and/or program code) for execution by the processor 220. The processor 220 may execute the set of instructions to perform one or more processes described herein. In some implementations, execution of the set of instructions, by one or more processors 220, causes the one or more processors 220 and/or the device 200 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 2 are provided as an example. The device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Figure 3:
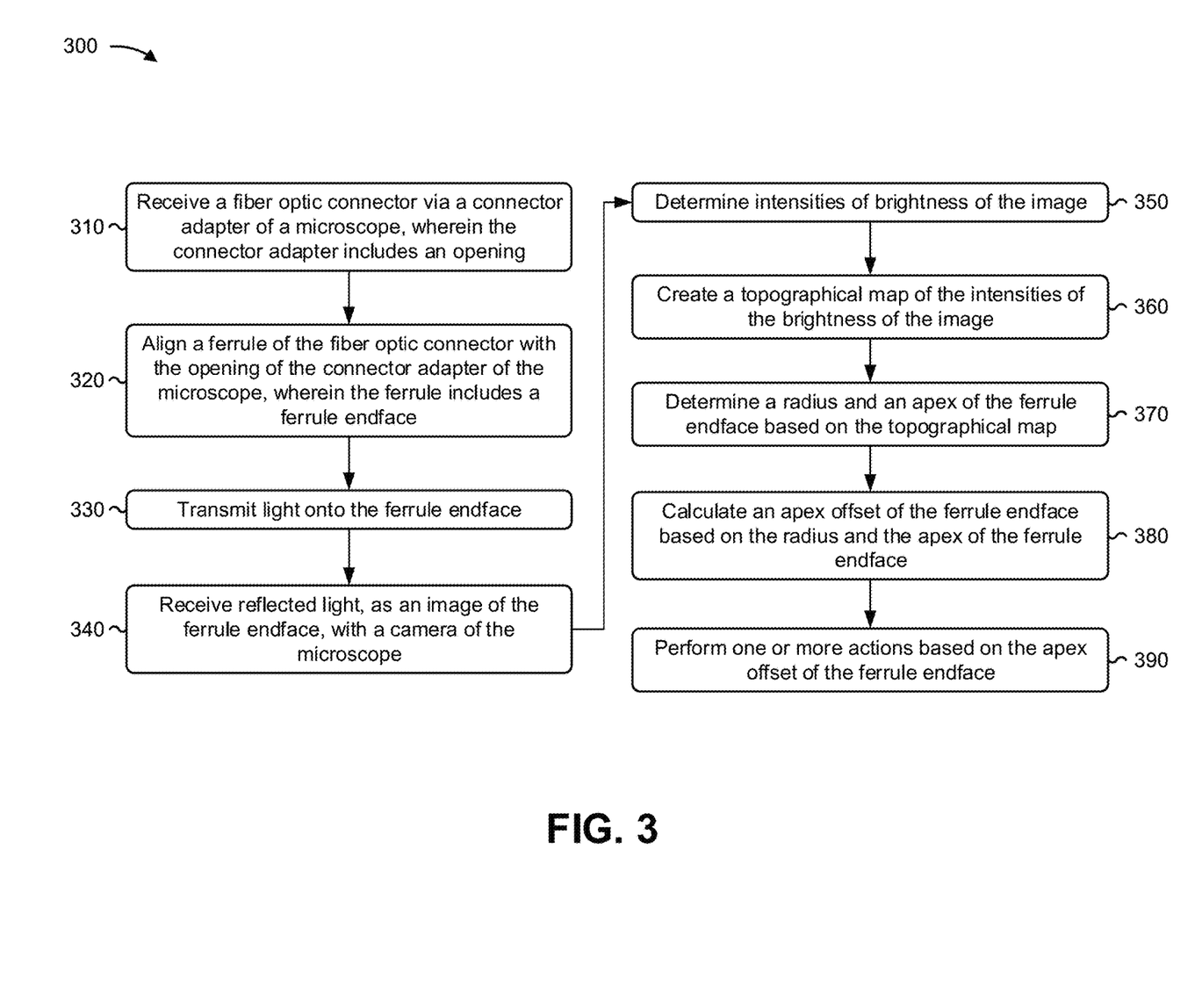
FIG. 3 is a flowchart of an example process for lighting and processing for microscopic measurement of a polish radius and an apex offset of a fiber optic connector.

FIG. 3 is a flowchart of an example process 300 for lighting and processing for microscopic measurement of a polish radius and an apex offset of a fiber optic connector. In some implementations, one or more process blocks of FIG. 3 may be performed by a microscope (e.g., the microscope 105). In some implementations, one or more process blocks of FIG. 3 may be performed by another device or a group of devices separate from or including the microscope. Additionally, or alternatively, one or more process blocks of FIG. 3 may be performed by one or more components of the device 200, such as the processor 220, the memory 230, the storage component 240, the input component 250, the output component 260, and/or the communication component 270.

As shown in FIG. 3, process 300 may include receiving a fiber optic connector via a connector adapter of a microscope, wherein the connector adapter includes an opening (block 310). For example, the microscope may receive a fiber optic connector via a connector adapter of the microscope, as described above. In some implementations, the connector adapter includes an opening.

As further shown in FIG. 3, process 300 may include aligning a ferrule of the fiber optic connector with the opening of the connector adapter of the microscope, wherein the ferrule includes a ferrule endface (block 320). For example, the microscope may align a ferrule of the fiber optic connector with the opening of the connector adapter of the microscope, as described above. In some implementations, the ferrule includes a ferrule endface. In some implementations, the ferrule endface includes a spherical or other non-planar surface.

As further shown in FIG. 3, process 300 may include transmitting light onto the ferrule endface (block 330). For example, the microscope may transmit light onto the ferrule endface, as described above. In some implementations, the light includes Köhler illumination.

As further shown in FIG. 3, process 300 may include receiving reflected light, as an image of the ferrule endface, with a camera of the microscope (block 340). For example, the microscope may receive reflected light, as an image of the ferrule endface, with a camera of the microscope, as described above.

As further shown in FIG. 3, process 300 may include determining intensities of brightness of the image (block 350). For example, the microscope may determine intensities of brightness of the image, as described above. In some implementations, determining the intensities of the brightness of the image includes determining the intensities of the brightness of the image outward from a mechanical axis of the ferrule.

As further shown in FIG. 3, process 300 may include creating a topographical map of the intensities of the brightness of the image (block 360). For example, the microscope may create a topographical map of the intensities of the brightness of the image, as described above.

As further shown in FIG. 3, process 300 may include determining a radius and an apex of the ferrule endface based on the topographical map (block 370). For example, the microscope may determine a radius and an apex of the ferrule endface based on the topographical map, as described above. In some implementations, determining the radius and the apex of the ferrule endface based on the topographical map includes determining the apex of the ferrule endface as a brightest spot in the topographical map, and determining the radius of the ferrule endface based on a rate at which the intensities diminish moving away from the apex.

As further shown in FIG. 3, process 300 may include calculating an apex offset of the ferrule endface based on the radius and the apex of the ferrule endface (block 380). For example, the microscope may calculate an apex offset of the ferrule endface based on the radius and the apex of the ferrule endface, as described above. In some implementations, calculating the apex offset of the ferrule endface based on the radius and the apex of the ferrule endface includes determining a center of the ferrule endface based on an outer diameter of the ferrule, and calculating, as the apex offset, a difference between the center of the ferrule endface and the apex of the ferrule endface.

As further shown in FIG. 3, process 300 may include performing one or more actions based on the apex offset of the ferrule endface (block 390). For example, the microscope may perform one or more actions based on the apex offset of the ferrule endface, as described above. In some implementations, performing the one or more actions includes one or more of providing, for display, data identifying the apex offset of the ferrule endface; causing a technician to modify the ferrule endface based on the apex offset; causing a modification to a manufacturing process based on the apex offset; or providing, for display, an indication that the apex offset satisfies an offset value threshold for the ferrule endface.

In some implementations, performing the one or more actions includes determining that the apex offset satisfies an offset value threshold, and providing, for display, an indication that the apex offset satisfies the offset value threshold for the ferrule endface. In some implementations, performing the one or more actions includes determining that the apex offset fails to satisfy an offset value threshold, and causing a technician to modify the ferrule endface based on the apex offset failing to satisfy the offset value threshold.

Process 300 may include additional implementations, such as any single implementation or any combination of implementations described below and/or in connection with one or more other processes described elsewhere herein.

In some implementations, process 300 includes receiving, by a beam splitter of the microscope, the light from the light source; transmitting, by the beam splitter, the light onto the ferrule endface; receiving, by the beam splitter, the reflected light from the ferrule endface; and transmitting, by the beam splitter, the reflected light to the camera.

In some implementations, process 300 includes receiving, by a lens, provided between a light source and the connector adapter of the microscope, the light from the light source; transmitting, by the lens, the light onto the ferrule endface; receiving, by the lens, the reflected light from the ferrule endface; and transmitting, by the lens, the reflected light to the camera.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by a microscope, a ferrule of a fiber optic connector via an opening of a connector adapter of the microscope, wherein a body of the fiber optic connector remains outside of the connector adapter when the microscope receives the ferrule of the fiber optic connector within a body of the microscope;
aligning, by the microscope, the ferrule of the fiber optic connector with the opening of the connector adapter of the microscope,
wherein the ferrule includes a ferrule endface;
transmitting, by the microscope, light onto the ferrule endface;
receiving, by the microscope, reflected light, as an image of the ferrule endface, with a camera of the microscope;
determining, by the microscope, intensities of brightness of the image;
creating, by the microscope, a topographical map of the intensities of the brightness of the image;
determining, by the microscope, a radius and an apex of the ferrule endface based on the topographical map;
calculating, by the microscope, an apex offset of the ferrule endface based on the radius and the apex of the ferrule endface; and
performing, by the microscope, one or more actions based on the apex offset of the ferrule endface.

2. The method of claim 1, wherein the light includes Köhler illumination.

3. The method of claim 1, wherein performing the one or more actions comprises one or more of:
providing, for display, data identifying the apex offset of the ferrule endface;
causing a technician to modify the ferrule endface based on the apex offset;
causing a modification to a manufacturing process based on the apex offset; or
providing, for display, an indication that the apex offset satisfies an offset value threshold for the ferrule endface.

4. The method of claim 1, wherein the ferrule endface includes a spherical or other non-planar surface.

5. The method of claim 1, wherein determining the intensities of the brightness of the image comprises:
determining the intensities of the brightness of the image outward from a mechanical axis of the ferrule.

6. The method of claim 1, wherein determining the radius and the apex of the ferrule endface based on the topographical map comprises:
determining the apex of the ferrule endface as a brightest spot in the topographical map; and
determining the radius of the ferrule endface based on a rate at which the intensities diminish moving away from the apex.

7. The method of claim 1, wherein calculating the apex offset of the ferrule endface based on the radius and the apex of the ferrule endface comprises:
determining a center of the ferrule endface based on an outer diameter of the ferrule; and
calculating, as the apex offset, a difference between the center of the ferrule endface and the apex of the ferrule endface.

8. The method of claim 1, wherein performing the one or more actions comprises:
determining that the apex offset satisfies an offset value threshold; and
providing, for display, an indication that the apex offset satisfies the offset value threshold for the ferrule endface.

9. The method of claim 1, wherein performing the one or more actions comprises:
determining that the apex offset fails to satisfy an offset value threshold; and
causing a technician to modify the ferrule endface based on the apex offset failing to satisfy the offset value threshold.

10. A microscope, comprising:
a connector adapter, within an end of the microscope, configured to align a ferrule of a fiber optic connector with an opening of the connector adapter,
wherein the ferrule includes a ferrule endface, and
wherein a body of the fiber optic connector remains outside of the connector adapter when the connector adapter aligns the ferrule of the fiber optic connector;
a light source configured to transmit light to the ferrule endface;
a camera configured to receive reflected light as an image of the ferrule endface; and
one or more processors configured to:
determine intensities of brightness of the image,
create a topographical map of the intensities of the brightness of the image,
determine a radius and an apex of the ferrule endface based on the topographical map,
calculate an apex offset of the ferrule endface based on the radius and the apex of the ferrule endface, and
perform one or more actions based on the apex offset of the ferrule endface.

11. The microscope of claim 10, further comprising:
a beam splitter configured to:
receive the light from the light source,
transmit the light onto the ferrule endface,
receive the reflected light from the ferrule endface, and
transmit the reflected light to the camera.

12. The microscope of claim 10, wherein the one or more processors, to perform the one or more actions, are configured to one or more of:
provide, for display, data identifying the apex offset of the ferrule endface;
cause a technician to modify the ferrule endface based on the apex offset;
cause a modification to a manufacturing process based on the apex offset; or
provide, for display, an indication that the apex offset satisfies an offset value threshold for the ferrule endface.

13. The microscope of claim 10, wherein the ferrule endface includes a spherical or other non-planar surface.

14. The microscope of claim 10, wherein the one or more processors, to determine the intensities of the brightness of the image, are configured to:
determine the intensities of the brightness of the image outward from a mechanical axis of the ferrule.

15. The microscope of claim 10, wherein the one or more processors, to determine the radius and the apex of the ferrule endface based on the topographical map, are configured to:
determine the apex of the ferrule endface as a brightest spot in the topographical map; and
determine the radius of the ferrule endface based on a rate at which the intensities diminish moving away from the apex.

16. The microscope of claim 10, further comprising:
a lens, provided between the light source and the connector adapter, configured to:
receive the light from the light source,
transmit the light onto the ferrule endface,
receive the reflected light from the ferrule endface, and
transmit the reflected light to the camera.

17. The microscope of claim 10, wherein the one or more processors, to calculate the apex offset of the ferrule endface based on the radius and the apex of the ferrule endface, are configured to:
determine a center of the ferrule endface based on an outer diameter of the ferrule; and
calculate, as the apex offset, a difference between the center of the ferrule endface and the apex of the ferrule endface.

18. The microscope of claim 10, wherein the one or more processors, to perform the one or more actions, are configured to:
determine that the apex offset satisfies an offset value threshold; and
provide, for display, an indication that the apex offset satisfies an offset value threshold for the ferrule endface.

19. The microscope of claim 10, wherein the one or more processors, to perform the one or more actions, are configured to:
determine that the apex offset fails to satisfy an offset value threshold; and
cause a technician to modify the ferrule endface based on the apex offset failing to satisfy the offset value threshold.

20. A system, comprising:
a fiber optic connector comprising a ferrule with a ferrule endface; and
a microscope comprising:
a connector adapter within an end of the microscope, configured to align the ferrule of the fiber optic connector with an opening of the connector adapter,
wherein a body of the fiber optic connector remains outside of the connector adapter when the connector adapter aligns the ferrule of the fiber optic connector in a body of the microscope;
a light source configured to transmit light to the ferrule endface;
a camera configured to receive reflected light as an image of the ferrule endface; and
one or more processors configured to:
  determine intensities of brightness of the image,
  create a topographical map of the intensities of the brightness of the image,
  determine a radius and an apex of the ferrule endface based on the topographical map,
  calculate an apex offset of the ferrule endface based on the radius and the apex of the ferrule endface, and
  perform one or more actions based on the apex offset of the ferrule endface.

\* \* \* \* \*